United States Patent [19]

Kane et al.

[11] Patent Number: 5,129,850

[45] Date of Patent: Jul. 14, 1992

[54] METHOD OF MAKING A MOLDED FIELD EMISSION ELECTRON EMITTER EMPLOYING A DIAMOND COATING

[75] Inventors: Robert C. Kane, Woodstock, Ill.; James E. Jaskie, Scottsdale, Ariz.

[73] Assignee: Motorola, Inc., Schaumburg, Ill.

[21] Appl. No.: 747,562

[22] Filed: Aug. 20, 1991

[51] Int. Cl.⁵ .................................. H01J 9/02
[52] U.S. Cl. ............................... 445/24; 445/50
[58] Field of Search ............ 445/24, 50; 313/309, 313/336, 355; 164/46

[56] References Cited

U.S. PATENT DOCUMENTS

| | | | |
|---|---|---|---|
| 4,008,412 | 2/1977 | Yuito et al. | 313/309 |
| 4,164,680 | 8/1979 | Villalobos | 313/336 |
| 4,277,293 | 7/1981 | Nelson et al. | 437/9 |
| 4,307,507 | 12/1981 | Gray et al. | 445/50 X |
| 4,774,991 | 10/1988 | Holden | 164/46 |
| 5,074,456 | 12/1991 | Degner et al. | 228/121 |

*Primary Examiner*—Kenneth J. Ramsey

[57] ABSTRACT

A field emission electron emitter employing a coating of diamond material disposed on a surface of a layer of conductive/semiconductive material is constructed by a method including the steps of implanting carbon ions at a surface of a selectively shaped substrate to function as nucleation sites for the diamond formation. A conductive layer is deposited over the diamond and the substrate is removed to leave an electron emitter with a diamond coating.

15 Claims, 6 Drawing Sheets

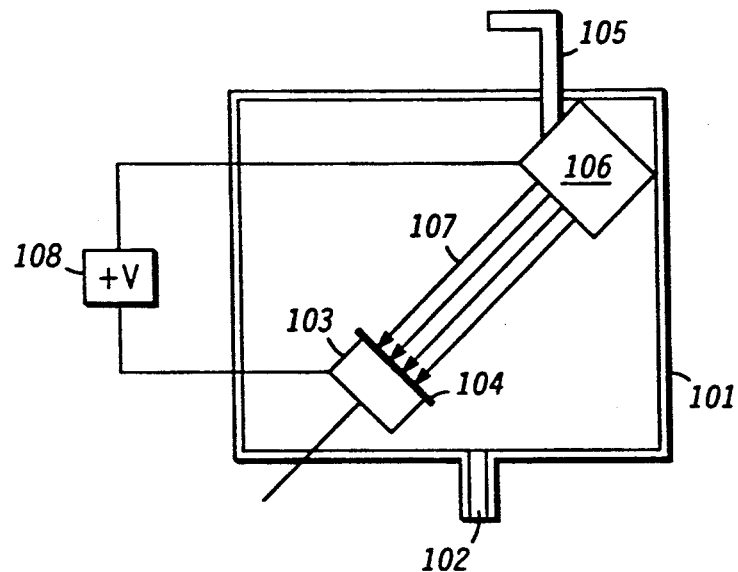
FIG. 1
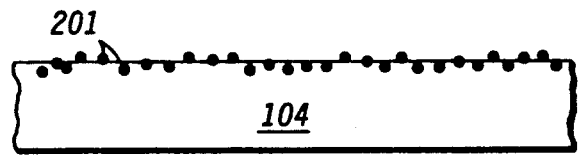
FIG. 2
FIG. 3
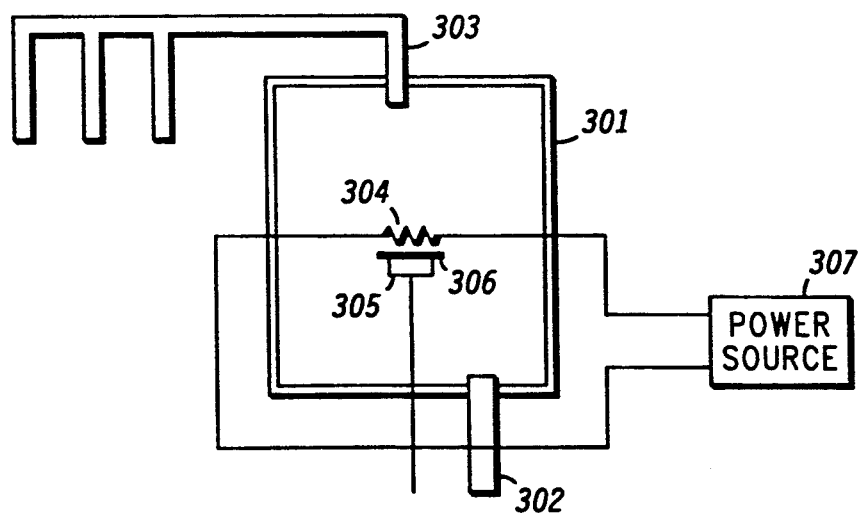

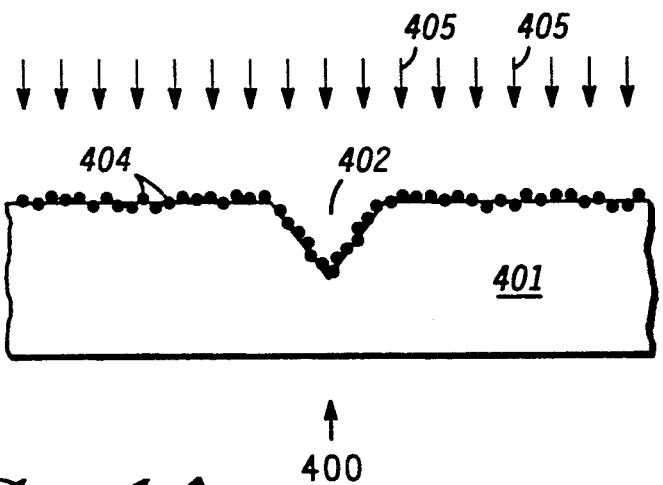
FIG. 4A
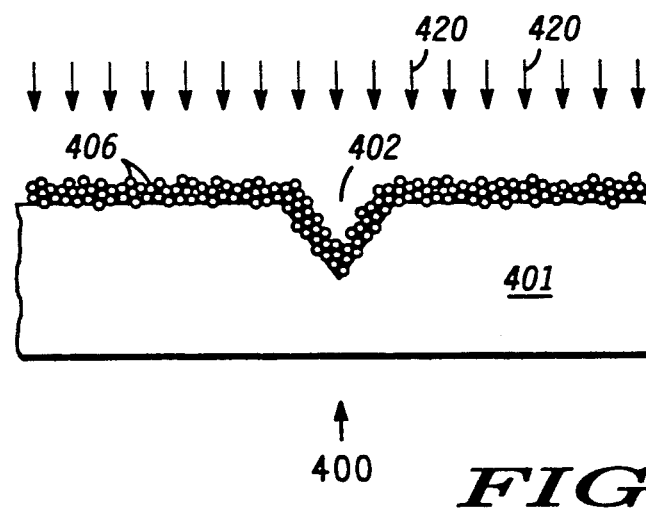
FIG. 4B
FIG. 4C
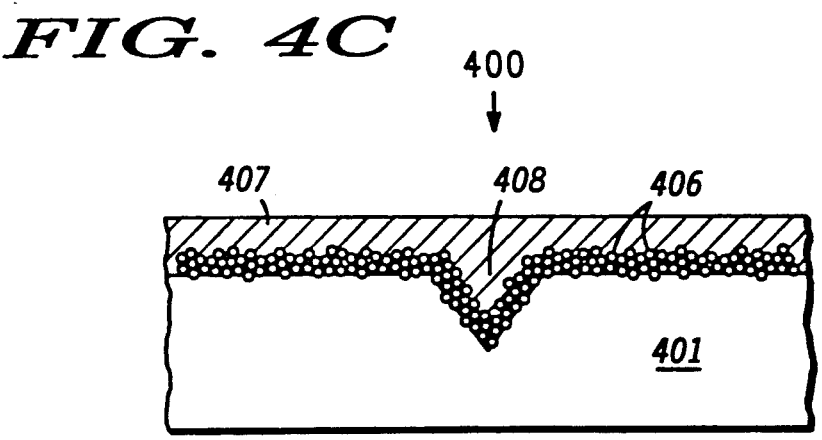

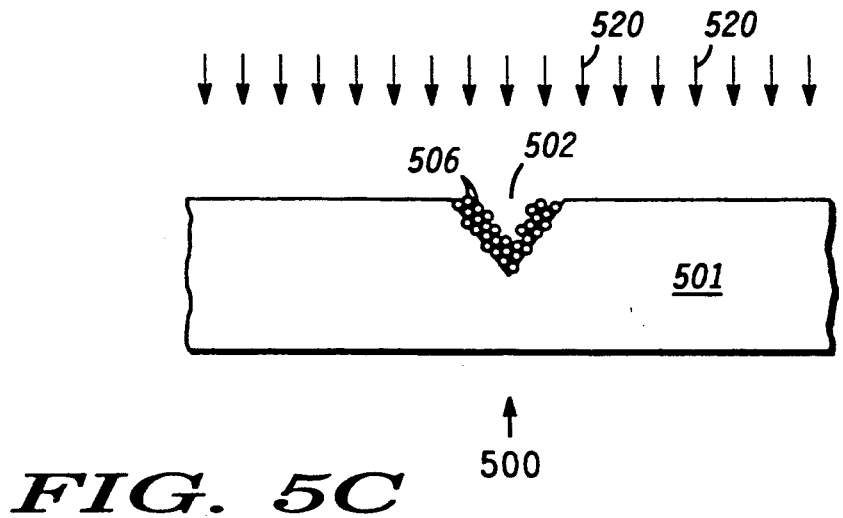
FIG. 5C
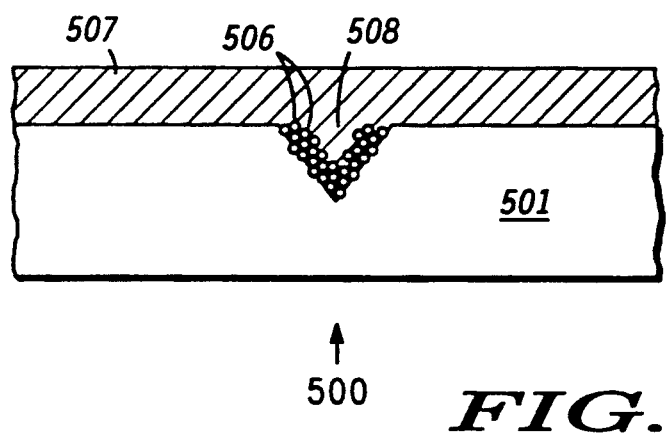
FIG. 5D
FIG. 5D
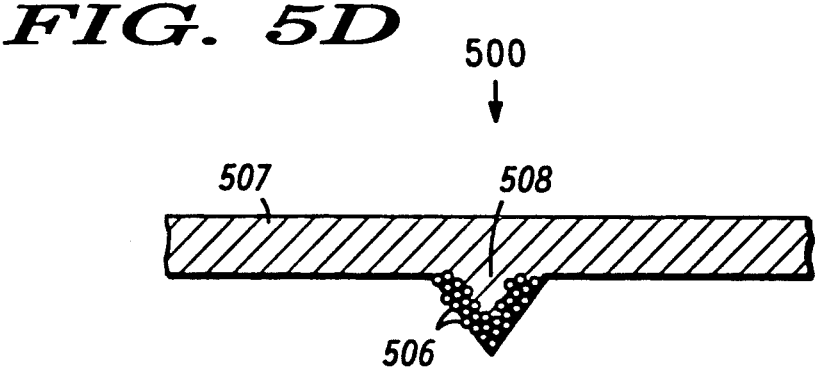

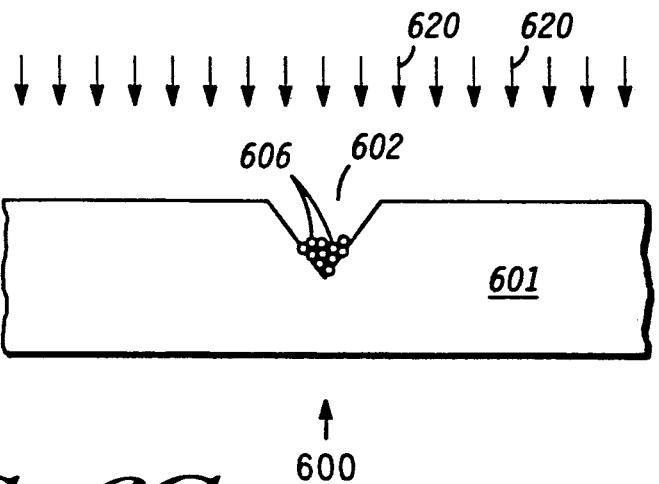
FIG. 6C
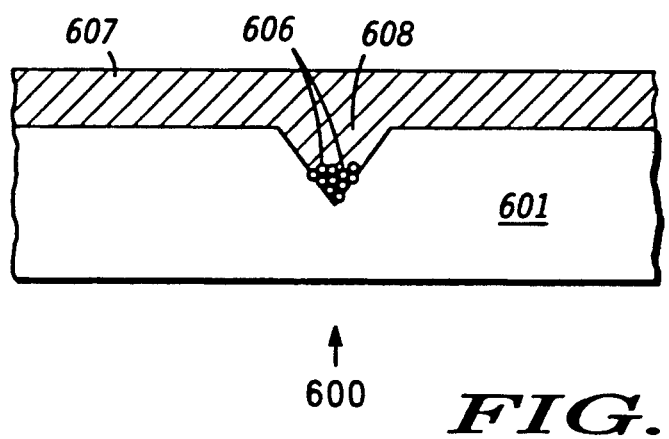
FIG. 6D
FIG. 6E
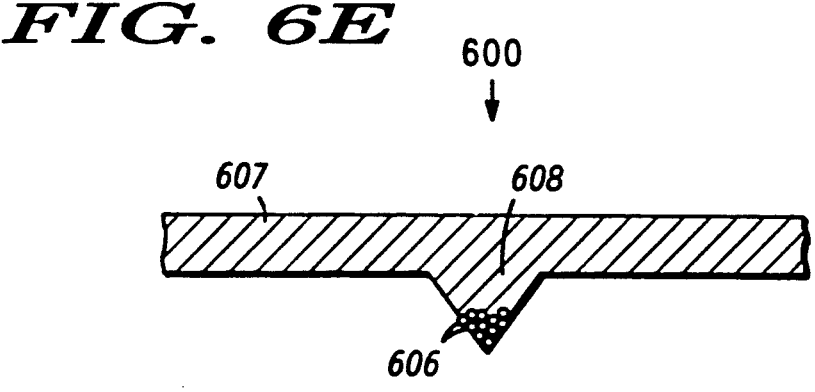

# METHOD OF MAKING A MOLDED FIELD EMISSION ELECTRON EMITTER EMPLOYING A DIAMOND COATING

FIELD OF THE INVENTION

The present invention relates generally to field emission electron emitters and more particularly to field emission electron emitters and methods of producing field emission electron emitters employing low/negative electron affinity coatings.

BACKGROUND OF THE INVENTION

Field emission devices employing preferentially shaped conductive/semiconductive electrodes as electron emitters are known in the art. The prior art electron emitters are known to exhibit undesirable characteristics such as high operating voltages, surface instability, and susceptibility to ion bombardment damage.

Accordingly there exists a need for electron devices employing an electron emitter/electron source which overcomes at least some of the shortcomings of electron emitters of the prior art.

SUMMARY OF THE INVENTION

This need and others are substantially met through provision of a method of forming an electron emitter including the steps of providing a selectively shaped substrate having a major surface, implanting ions, as nucleation sites, onto at least a part of the major surface of the selectively shaped substrate, growing diamond crystallites preferentially at at least some of the nucleation sites, depositing a layer of conductive/semiconductive material onto at least a part of the major surface of the substrate and the diamond crystallites, and removing at least some of the selectively shaped substrate, such that an electron emitter having a coating of diamond disposed on at least a part of the conductive/semiconductive layer is formed.

This need and others are further met through provision of a field emission electron emitter comprising in one embodiment of the present invention a diamond coating grown from carbon nucleation sites which have been disposed on at least a part of a selectively shaped substrate and in another embodiment of the present invention a field emission electron emitter having a diamond coating grown from carbon nucleation sites which have been selectively disposed on a part of a selectively shaped substrate.

BRIEF DESCRIPTION OF THE DRAWINGS

FIG. 1 is a schematic representation of ion implantation apparatus.

FIG. 2 is a cross sectional depiction of ion implantation.

FIG. 3 is a schematic representation of diamond growing environment apparatus.

FIGS. 4A-4D are side elevational depictions of structures which are realized by performing various steps of a method in accordance with the present invention.

FIGS. 5A-5E are side elevational depictions of structures which are realized by performing various steps of another method in accordance with the present invention.

FIGS. 6A-6E are side elevational representations of structures which are realized by performing various steps of yet another method in accordance with the present invention.

DETAILED DESCRIPTION OF THE PREFERRED EMBODIMENTS

Figure 4D:
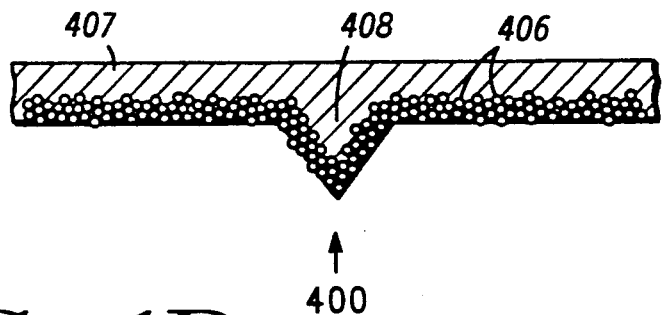

Referring now to FIG. 1 there is shown a representative schematical depiction of one embodiment of ion implantation apparatus. An evacuated enclosure 101 is provided wherein at least an ion source 106 and a substrate (target) holding fixture 103 are disposed. An ion material source aperture 105 is provided, as shown, to supply the ion source 106 with material. An evacuation port 102 is provided to which an evacuating device, not shown, is operably coupled to evacuate enclosure 101. During operation of the implantation apparatus an ion beam 107 is directed to a target, which in this example is a semiconductor substrate 104, due to an electric field which is induced by a voltage source 108, such that at least some of the ions which comprise ion beam 107 are implanted in substrate 104.

FIG. 2 is an enlarged side elevational depiction of substrate 104 wherein ions 201 have been implanted. Ions are selectively implanted to a desired depth in substrate 104 material depending on the strength of the associated accelerating electric field (not shown). Correspondingly, the electric field strength is selected so that implanted ions are substantially disposed at the surface of substrate 104.

FIG. 3 is a representative schematical depiction of one embodiment of diamond growing environment apparatus. An evacuated enclosure 301 is provided wherein a substrate (target) holder 305 and a heating element 304 are disposed. A source tube 303, which is a part of a gas supply manifold, provides a source of reactive gas constituents into the diamond growing environment. Enclosure 301 is suitably evacuated by operably coupling an evacuation pump (not shown) to an evacuation port 302. During operation a target, which in this example is a substrate 306, is disposed on target holder 305 to which heating element 304 is also proximally disposed. Power source 307 provides electrical current through heating element 304 to heat substrate 306 and in the presence of appropriate gas constituents a reaction occurs at the surface of substrate 306 during which diamond is grown.

Diamond growth is at least partially dependent on an ability to nucleate at the surface of a material. In many methods of diamond formation the nucleation is random and not well distributed giving rise to undesirable and incomplete film growth. Carbon ions implanted at a surface of substrate 306 provide a substantially uniformly distributed plurality of nucleation sites from which diamond growth is initiated.

Referring now to FIG. 4A, there is shown an enlarged side elevational depiction of a structure 400 which is realized by performing various steps in accordance with a method of the present invention. Structure 400 includes a selectively shaped supporting layer or layers, hereinafter substrate 401, having a major surface, wherein substrate 401 is selectively shaped by any of many known techniques including, but not limited to, anisotropic etching and ion milling, to provide a selectively shaped region, which in this embodiment is a generally notch shaped depression 402. A carbon ion beam, depicted by arrows 405, provides for implantation of carbon nucleation sites 404 at substrate 401.

FIG. 4B is a side elevational depiction of structure 400 having undergone additional steps of the method in accordance with the present invention wherein a source of reactant material, depicted by arrows 420, disposed in an intervening region between substrate 401 and a proximal heating element (304 in FIG. 3) gives rise to growth of a diamond crystallite coating 406 preferentially at the implanted carbon nucleation sites.

FIG. 4C is a side elevational depiction of structure 400 having undergone an additional step of the method wherein a layer of conductive/semiconductive material 407 is deposited onto any exposed part of the major surface of substrate 401 and onto diamond crystallite coating 406. Conductive/semiconductive material 407 is deposited so as to fill depression 402 with a projection 408.

FIG. 4D is a side elevational depiction of structure 400 having undergone an additional process step in accordance with the method of the present invention wherein at least some of substrate 401 has been removed. Removal of substrate 401 material effectively exposes the layer of conductive/semiconductive material 407, and especially exposes projection 408, on which is disposed diamond crystallite coating 406. It should be understood that the material or materials of substrate 401 and the conductive/semiconductive material 407 are chosen so that substrate 401 can be relatively easily removed, by some method such as etching, dissolving or the like, without substantially effecting crystallite coating 406 or conductive/semiconductive material 407.

The resultant structure, which includes a coating of diamond, comprises a field emission electron emitter exhibiting a number of desirable operating characteristics including reduced voltage operation, improved surface stability, and reduced susceptability to ion bombardment damage. Incorporation of implanted carbon nucleation sites provides a mechanism for improved diamond crystallite coverage and discourages the formation of a non-uniform coating which may include undesirably large crystallite growth.

Figure 5A:
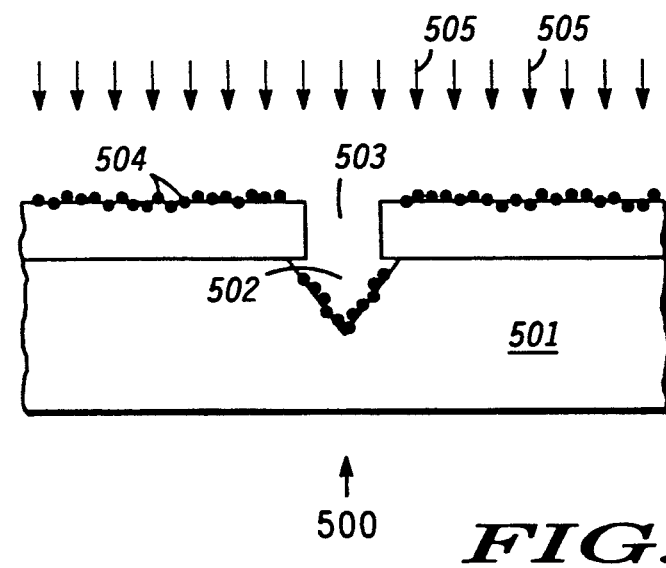

FIG. 5A is an enlarged side elevational depiction of a structure 500 which is realized by performing steps of another method in accordance with the present invention. A supporting layer or substrate 501 having a major surface is provided. A layer of patternable material 509, such as photoresist or insulator material, is disposed on substrate 501. Subsequently, layer of patternable material 509 is selectively exposed and developed to provide at least one aperture 503 through which selective anisotropic shaping of substrate 501 is performed to provide a selectively shaped region, which in this embodiment is a generally notch shaped depression 502. A carbon ion beam, depicted by arrows 505, provides for implantation of nucleation sites 504 in depression 502 of substrate 501.

Figure 5B:
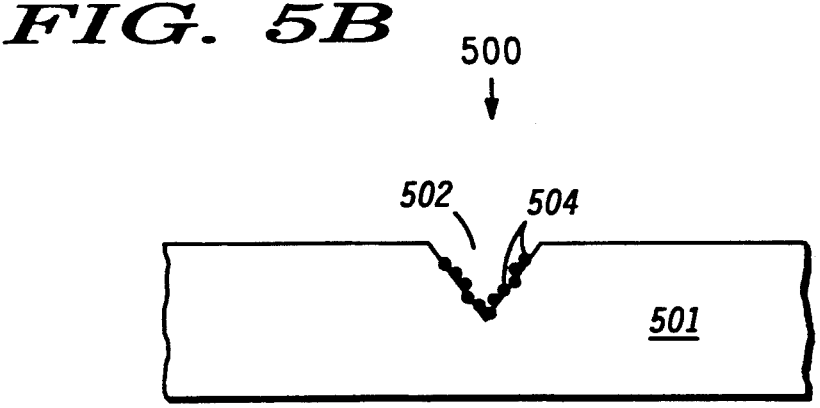

FIG. 5B is a side elevational depiction of structure 500 showing layer of patternable material 509 removed subsequent to the implantation of nucleation sites 504.

FIG. 5C is a side elevational depiction of structure 500 having undergone additional steps of the method wherein a source of reactant material, depicted by arrows 520, disposed in an intervening region between substrate 501 and a proximal heating element (see FIG. 3), gives rise to growth of diamond crystallite 506 preferentially at the implanted carbon nucleation sites.

FIG. 5D is a side elevational depiction of structure 500 having undergone an additional step of the method wherein a layer of conductive/semiconductive material 507 is deposited onto any exposed part of the major surface of substrate 501 and onto diamond crystallite 506. Conductive/semiconductive material 507 is deposited so as to fill depression 502 with a projection 508.

FIG. 5E is a side elevational view of structure 500 having undergone an additional step of the method of the present invention wherein at least some of substrate 501 has been removed. Removal of substrate 501 material effectively exposes the layer of conductive/semiconductive material 507, and especially exposes projection 508, on which is disposed diamond crystallite 506.

Utilizing implanted nucleation sites from which diamond crystallite growth may be initiated provides for a more uniform coating. Since coating thicknesses on the order of 10 A to less than 5000 A are desirable it is an important feature of coating formation that irregularities in coating thickness and coverage be minimized. Other methods of realizing diamond film growth do not provide for substantially uniform growth thickness and coverage.

Figure 6A:
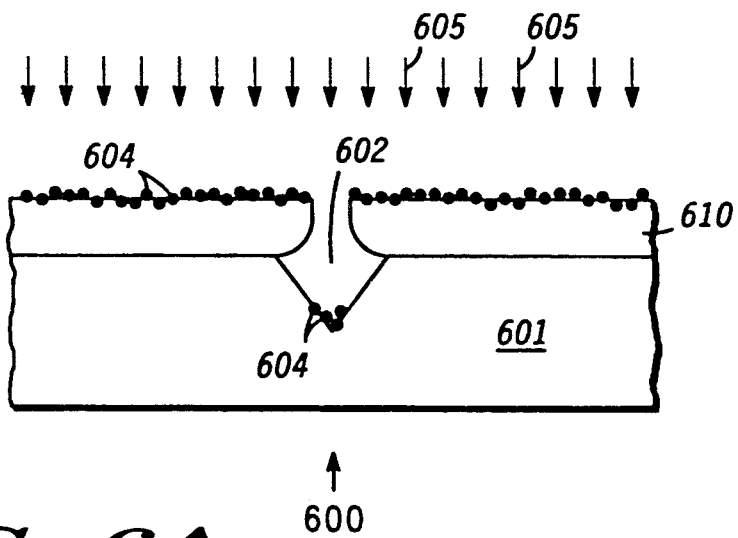

FIG. 6A is a side elevational depiction of a structure 600 constructed by yet another method in accordance with the present invention. Structure 600 is similar to structure 500 described previously with reference to FIG. 5B, wherein similar features initially described in FIG. 5B are similarly referenced beginning with the numeral "6". FIG. 6A further depicts a low angle material evaporation employed to deposit material 610 onto a substrate 601 so that a selectively shaped region 602 of substrate 601 is partially closed over. FIG. 6A further illustrates an ion beam, depicted by arrows 605, from which carbon nucleation sites 604 are implanted in selectively shaped region 602 of substrate 601 and substantially at a preferred part of selectively shaped region 602, in this specific embodiment the tip of the notch.

Figure 6B:
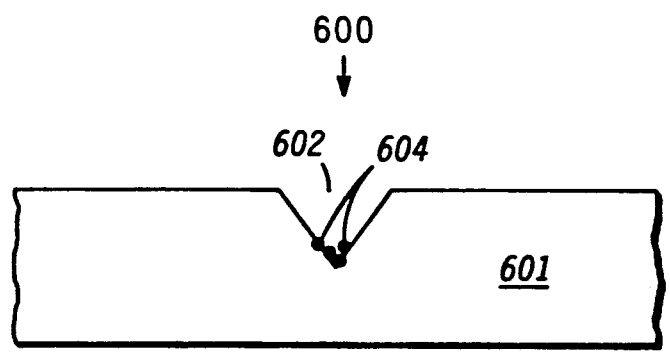

FIG. 6B depicts structure 600 having undergone an additional process step wherein material 610 has been removed.

FIG. 6C is a side elevational depiction of structure 600 having undergone additional steps of the method wherein a source of reactant material, depicted by arrows 620, disposed in an intervening region between the substrate 601 and a proximal heating element (see FIG. 3), gives rise to growth of diamond crystallite 606 preferentially at the implanted carbon nucleation sites. In the instance of the structure of FIG. 6C the crystallite growth takes place preferentially on only a part of the exposed surface of substrate 601 and, more specifically, in the extreme tip of selectively shaped region 602.

FIG. 6D is a side elevational depiction of structure 600 having undergone an additional step of the method wherein a layer of conductive/semiconductive material 607 is deposited onto any exposed part of the major surface of substrate 601 and onto diamond crystallite 606. Conductive/semiconductive material 607 is deposited so as to fill selectively shaped region 602 with a projection 608.

FIG. 6E is a side elevational view of structure 600 having undergone an additional step of the method of the present invention wherein at least some of substrate 601 has been removed. Removal of substrate 601 material effectively exposes the layer of conductive/semiconductive material 607, and especially exposes projection 608, on the tip of which is disposed diamond crystallite 606.

The methods described provide for electron emitter structures which, when employed in field emission devices, exhibit operating characteristics not attainable by means known in the prior art. Field emission devices employing electron emitters, formed by methods of the present invention, provide for improved operation, increased stability, and longer lifetime devices. The diamond coating, of the electron emitter, exhibits a much lower work function, derived from an inherent low/negative electron affinity, and a more stable crystalline structure than may be realized by using materials previously employed for electron emitters.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What we claim is:

1. A method of forming an electron emitter comprising the steps of:
   providing a selectively shaped substrate having a major surface;
   implanting ions, as nucleation sites, onto at least a part of the major surface of the selectively shaped substrate;
   growing diamond crystallites preferentially at at least some of the nucleation sites;
   depositing a layer of conductive/semiconductive material onto at least a part of the major surface of the substrate and the diamond crystallites; and
   removing at least some of the selectively shaped substrate, such that an electron emitter having a coating of diamond disposed on at least a part of the conductive/semiconductive layer is formed.

2. The method of claim 1 wherein the step of implanting ions includes implanting carbon ions.

3. The method of claim 1 wherein the step of providing a selectively shaped substrate includes anisotropically etching a substrate including semiconductor material.

4. The method of claim 1 wherein the step of providing a selectively shaped substrate includes ion milling of the substrate material.

5. A method for forming a field emission electron emitter comprising the steps of:
   providing a substrate having a major surface;
   depositing a layer of patternable material on the major surface of the substrate;
   patterning the layer of patternable material to provide an aperture therethrough and expose a part of the major surface of the substrate;
   anisotropically etching the exposed substrate to selectively shape the substrate substantially at the exposed part;
   implanting ions, as nucleation sites, onto at least a part of the selectively shaped substrate substantially at a region corresponding to the aperture;
   growing diamond crystallites preferentially at at least some of the nucleation sites;
   depositing a layer of conductive/semiconductive material onto the major surface of the substrate and diamond crystallites; and
   removing at least some of the selectively shaped substrate, such that a selectively shaped electron emitter having a coating of diamond crystallites disposed thereon is formed.

6. The method of claim 5 wherein the step of implanting ions includes implanting carbon ions.

7. The method of claim 5 wherein the step of providing a selectively shaped substrate includes anisotropically etching a substrate of semiconductor material.

8. The method of claim 5 wherein the step of providing a selectively shaped substrate includes ion milling of the substrate material.

9. The method of claim 5 and further comprising the step of removing substantially all of the patternable material subsequent to ion implantation.

10. A method for forming a field emission electron emitter comprising the steps of:
    providing a substrate having a major surface;
    depositing a layer of patternable material on the major surface of the substrate;
    patterning the layer of patternable material to provide an aperture therethrough to expose a part of the major surface of the substrate;
    performing an anisotropic etch to selectively shape the substrate substantially at the exposed part;
    performing a low angle material evaporation to partially close the aperture;
    implanting ions, as nucleation sites, onto at least a part of the selectively shaped substrate substantially at a region corresponding to the partially closed aperture;
    growing diamond crystallites preferentially at at least some of the nucleation sites;
    depositing a layer of conductive/semiconductive material onto the major surface of the substrate and the diamond crystallites; and
    removing at least some of the selectively shaped substrate, such that an electron emitter having a coating of diamond disposed on at least a part of a major surface of a selectively shaped conductive/semiconductive electrode is formed.

11. The method of claim 10 wherein the step of implanting ions includes implanting carbon ions.

12. The method of claim 10 wherein the step of providing a selectively shaped substrate includes anisotropically etching a substrate of semiconductor material.

13. The method of claim 10 wherein the step of providing a selectively shaped substrate includes ion milling of the substrate material.

14. The method of claim 10 and further comprising the step of removing substantially all of the patternable material subsequent to performing the anisotropic etch step.

15. The method of claim 10 and further comprising the step of removing substantially all of the material of the low angle material evaporation subsequent to performing the ion implantation step.

* * * * *